US 8,190,809 B2

(12) United States Patent
Hutson (10) Patent No.: US 8,190,809 B2
(45) Date of Patent: May 29, 2012

(54) SHUNTED INTERLEAVE FOR ACCESSING PLURAL MEMORY BANKS, PARTICULARLY THOSE HAVING PARTIALLY ACCESSED CELLS CONTAINING DATA FOR CACHE LINES (75) Inventor: Maurice L. Hutson, Byron, MN (US)

(73) Assignee: Efficient Memory Technology, Rochester, MN (US)

( * ) Notice: Subject to any disclaimer, the term of this patent is extended or adjusted under 35 U.S.C. 154(b) by 298 days.

(21) Appl. No.: 12/698,719

(22) Filed: Feb. 2, 2010

(65) Prior Publication Data
US 2010/0138587 A1 Jun. 3, 2010

Related U.S. Application Data (63) Continuation-in-part of application No. 11/719,926, filed as application No. PCT/US2005/042107 on Nov. 21, 2005, now Pat. No. 7,779,198.

(60) Provisional application No. 60/630,551, filed on Nov. 23, 2004.

(51) Int. Cl.
G06F 12/06 (2006.01)

(52) U.S. Cl. .................... 711/5; 711/157; 711/E12.082; 711/E12.001

(58) Field of Classification Search .................... 711/5
See application file for complete search history.

(56) References Cited

U.S. PATENT DOCUMENTS

| 5,293,607 | A | * | 3/1994 | Brockmann et al. ............. 711/5 |
| 5,379,393 | A | | 1/1995 | Yang |
| 5,452,470 | A | | 9/1995 | Kantner ................... 395/200.08 |
| 5,596,686 | A | | 1/1997 | Duluk ............................ 395/122 |
| 5,634,034 | A | | 5/1997 | Foster ........................... 395/474 |
| 5,790,110 | A | | 8/1998 | Baker et al. ................... 345/202 |
| 5,995,438 | A | | 11/1999 | Jeng ........................ 365/230.03 |
| 6,131,146 | A | * | 10/2000 | Aono ............................ 711/157 |
| 6,252,611 | B1 | | 6/2001 | Kondo .......................... 345/516 |
| 6,292,194 | B1 | | 9/2001 | Powell, III .................... 345/430 |
| 6,381,668 | B1 | | 4/2002 | Lunteren ......................... 711/5 |
| 6,430,672 | B1 | | 8/2002 | Dhong et al. ................. 711/220 |
| 6,480,943 | B1 | * | 11/2002 | Douglas et al. ............... 711/157 |

(Continued)

OTHER PUBLICATIONS

Office Action for U.S. Appl. No. 12/831,400, filed Jul. 7, 2010, mailed May 6, 2011, pp. 1-9.

(Continued)

*Primary Examiner* — Kenneth Lo
(74) *Attorney, Agent, or Firm* — Westerman, Champlin & Kelly, P.A.

(57) ABSTRACT

A bank select device has a plurality of addressable locations and a plurality of storage locations correlated to each other so that each storage location is correlated to plural addressable locations and each addressable location is correlated to one storage location. Each storage location contains a respective bank select. The addressable locations and storage locations are grouped into interleave patterns such that, for each pattern, there are Q storage locations and $2^A$ addressable locations arranged in L sequential loops each containing Q sequentially addressable locations and a remainder loop containing R sequentially addressable locations, where $L \cdot Q + R = 2^A$. A shunt defines a non-zero offset for each interleave so that each interleave commences with a different bank select and a complete rotation of all of the interleaves addresses each of the memory banks an equal number of times. The shunt (S) may be selected as $\mod(2^A, Q)$, $-Q + \mod(2^A, Q)$, $\pm 1$ or $\pm$prime to $\varkappa$, where $-\varkappa < S < +\varkappa$. The bank select is particularly useful for partially accessing rows of memory data to access data as cache lines.

20 Claims, 4 Drawing Sheets

U.S. PATENT DOCUMENTS

| | | | |
|---|---|---|---|
| 6,665,768 B1 | 12/2003 | Redford | 711/5 |
| 6,732,253 B1 | 5/2004 | Redford | 712/22 |
| 6,807,602 B1 | 10/2004 | Hornung et al. | 711/5 |
| 6,807,603 B2 * | 10/2004 | Gupta et al. | 711/5 |
| 6,874,070 B2 | 3/2005 | Gupta et al. | 711/157 |
| 6,895,488 B2 | 5/2005 | Feung et al. | 711/202 |
| 6,925,589 B1 | 8/2005 | Ben-Ezri | 714/724 |
| 6,931,518 B1 | 8/2005 | Redford | 712/237 |
| 7,266,132 B1 | 9/2007 | Liu et al. | 370/538 |
| 7,266,651 B1 | 9/2007 | Cypher | 711/157 |
| 7,318,114 B1 | 1/2008 | Cypher | 711/3 |
| 7,337,275 B2 | 2/2008 | Wolrich et al. | 711/132 |
| 7,418,571 B2 | 8/2008 | Wolrich et al. | 711/202 |
| 7,471,589 B2 | 12/2008 | Kim et al. | 365/230.06 |
| 7,487,505 B2 | 2/2009 | Rosenbluth et al. | 718/104 |
| 7,515,453 B2 | 4/2009 | Rajan | 365/63 |
| 7,515,588 B2 | 4/2009 | Naik et al. | 370/392 |
| 7,610,451 B2 | 10/2009 | Wolrich et al. | 711/150 |
| 7,610,457 B2 | 10/2009 | Lee | 711/157 |
| 7,634,621 B1 | 12/2009 | Coon et al. | 711/149 |
| 7,647,470 B2 | 1/2010 | Sasaki et al. | 711/203 |
| 2004/0019756 A1 | 1/2004 | Pergo | 711/170 |
| 2004/0093457 A1 | 5/2004 | Heap | 711/5 |
| 2005/0185437 A1 | 8/2005 | Wolrich et al. | 356/49 |
| 2009/0043943 A1 | 2/2009 | Hutson | |
| 2010/0312945 A1 | 12/2010 | Hutson | |

OTHER PUBLICATIONS

Extended European Search Report of The Hague in counterpart foreign application No. 11153036.6 filed Feb. 2, 2011.

B.R. Rau, "Pseudo-Randomly Interleaved Memory" *Proceedings of the Association for Computing Machinery*, pp. 74-83, Sep. 1991.

Song Chen et al, "Synthesis of Custom Interleaved Memory Systems" *IEEE Transactions on Very Large Scale Integrated (VLSI) Systems*, pp. 74-83, vol. 8, No. 1, Feb. 2000.

Z. Zhang et al, "Breaking Address Mapping Symmetry at Multi-level of Memory Hierarchy to Reduce DRAM Row-buffer Conflicts"*Journal of Instruction-level Parallelism*, vol. 3, pp. 1-34, 2002, the year of publication being sufficiently earlier that the effective U.S. filing date of the present application and any foreign priority date so that the particular month of publication is not an issue.

* cited by examiner

SHUNTED INTERLEAVE FOR ACCESSING PLURAL MEMORY BANKS, PARTICULARLY THOSE HAVING PARTIALLY ACCESSED CELLS CONTAINING DATA FOR CACHE LINES

CROSS-REFERENCE TO RELATED APPLICATION

The present application is a continuation-in-part of and claims priority of U.S. patent application Ser. No. 11/719,926, filed May 22, 2007, now U.S. Pat. No. 7,779,198 granted Aug. 17, 2010, which in turn is a Section 371 National Stage Application of International Application No. PCT/US/2005/042107 filed Nov. 21, 2005 published as WO/2006/057949 on Jan. 6, 2006 in English, which in turn is based on and claims benefit of U.S. Provisional Application No. 60/630,551 filed Nov. 23, 2004, the content of each which is hereby incorporated by reference in its entirety.

FIELD OF THE INVENTION

This invention relates to shunted interleaved addressing of memories having plural memory banks and particularly to shunted interleaves for accessing memory data for cache lines in banked and paged memories of the type that partially access data.

BACKGROUND OF THE INVENTION

Some interleaved memories contain banks that when one of the individually addressable data cells of the bank is accessed for a cache line, the bank activates the entire row of cells which includes the accessed cell. Generally, each bank holds only one or a few of its rows currently active, holding the row active for an indefinite amount of time from when the cell was first accessed to cause the row to become active until another cell is accessed to cause another one or more rows of the bank to become active. Thus, after initial use, each bank holds some one or more of its rows active as "partially accessed".

The purpose for holding a row active is that a cell is more quickly accessed if it is in a row that is already active. This feature is particularly useful where cache lines of related data are stored in data cells of a single row. Thus, accessing a single data cell to store a cache line in a cache also activates all other data cells of the row for possible quicker access. Consequently, a memory containing a plurality of banks, each with partial access capability, can access a number of cells more quickly than all its other cells; the number of cells ready for quick access being equal to the memory's total number of banks times the total number of active rows of each bank times the number of cells in each of the memory's rows.

Examples of memory banks with partial access capability include Extended Data Out Dynamic Random Access Memories (EDO DRAMs) and Fast Page Mode Dynamic Random Access Memories (FOP DRAMs), in which a row of the DRAM is kept charged while performing multiple reads or writes so that successive reads or writes within the row do not suffer the delay of pre-charge and access to the row.

Classical interleave patterns of memories having $n$ banks, where $n=2^B$ and $B \geq 1$, employ simple rotations through all $2^B$ banks. Within each rotation, each successively addressed row of a memory is in a row having a same row address but in the memory's next bank, and is successively selected by simply decoding the B address bits which are usually just lower in order than the row address bits and just higher in order than the cell address bits. Thus, each rotation of a classical interleave addresses the same respective row in each successive bank successively, e.g. rows 0 of banks 0, 1, 2, ..., $n-1$, rows 1 of banks 0, 1, 2, ..., $n-1$, rows 2 of banks 0, 1, 2, ..., $n-1$, through rows $2^n-1$ of banks 0, 1, 2, ..., $n-1$.

One problem with classically interleaved memories containing banks having partial access capability is that large blocks of data having some number $\geq 2^B$ of rows have each of their respective positions—beginning, ending and each position between—in the same banks of the memory. Because same positions of different blocks of data tend to be accessed for processing at the same time, then at different periods of time a different one of the banks of the memory tends to be the only bank being successively accessed for the data of two or more different blocks. When this happens, each of the banks in turn becomes the one being excessively accessed for cache lines in cells of different rows. Consequently, each row having just become active continually returns to being not active before another of the row's cells is accessed more quickly. Since its recognition, this problem has been only marginally solved.

The above-described problem was marginally solved by variously toggling and un-toggling one or more of the memory address's B bank-address bits, such as by using exclusive-OR (XOR) logic gates inputted by both a bank-address bit and one of the address's bits higher in order than the B bits or a single bit sum of more than one of the higher bits. The output of each gate replaced the output of the bank address bit which inputs the gate, thus replacing the bit's output for being decoded as for the classic interleave. Thus, one or more pairs of banks swapped positions in the order of rotation for the classic interleave, doing this differently for different ranges of memory's addressing. An example of this toggling technique is described in "Pseudo-Randomly Interleaved Memory," Proceedings of the Association for Computer Machinery, September 1991 by B. R. Rau.

These solutions were only marginally successful because where a swapping helped one pair of blocks of data for accessing more data more quickly from a row already partially accessed, it often harmed another pair. Consequently, different ranges of the memory's addressing had different orders of rotation for successively addressed rows being in successively selected banks and therefore had marginal success for having some same positions of blocks in different banks. While such pseudo-random toggling improved access to some data, it caused another problem. More particularly, accessing different blocks of different clashing rotations caused some additional accessing of data of different blocks in the same bank.

A solution is needed which distributes all data positions of all blocks of data of all memory from the smallest blocks (each row of cells) up to those blocks as large as the largest pages for mapping virtual data into physical memory, statistically distributing all of them evenly (in equal numbers) and finely (every few successive addresses) among all the interleaved banks, while avoiding clashing by also preserving a consistent respective order of rotation for successively selected banks for all addressing of memory. Consider a series of consecutively addressed same-sized blocks of data, of all memory, where each block's common size is the size of any one of all the successively doubling interleaved sizes—1 row, 2 rows, 4 rows, 8 rows, etc.—through the number of rows in the largest page for virtual mapping, and the number of rows of the smallest block is no less than the number of banks of one simple rotation. Such a series of blocks will have all respectively positioned rows of the blocks—all first (beginning) rows, second rows, third rows and so on through all last (ending) rows of the blocks—residing evenly and finely in all the banks of the rotation, equal or nearly equal (differing by no more than one) numbers of rows per bank. Thus in some embodiments of the present invention, the number of rows per bank per simple rotation equals the column height occupied by representations $\bar{F}$, F, X, Y and Z in ROM 14 of each of the shunted interleaves of FIGS. 4 and 5, the occupied heights which can differ by one because of the remainder loop, but no more than one.

My aforementioned patent application Ser. No. 11/719,926 describes abbreviated interleave patterns for successively accessing plural banks in a memory to retrieve or store data interleaved among a plurality of banks. In binary embodiments, an odd number of banks are accessed by a processor during each of a plurality of abbreviated interleaves to retrieve or store data elements in the banks. Thus, as applied to a memory containing $2^B$ banks, Q banks are accessed during each abbreviated interleave, where Q is an odd (that is, prime to the total number of banks), preferably a prime number, and $1 < Q < 2^B$. A rotation of $2^B$ successive abbreviated interleave patterns accesses each bank $2^A$ times, with each successive abbreviated interleave accessing a different set of Q banks also $2^A$ times. During each interleave, each bank of a set of Q banks is accessed L times and R banks of the set of Q banks are accessed one additional time each, where $2^A = L \cdot Q + R$ and $R = \mathrm{mod}(2^A, Q)$. My prior application describes a powerful technique that greatly increases the efficiency of the memory over that of the classic interleave technique for interleaving and accessing elements not via cache and that is about the same as the Ranade and Rau prime degree interleaves. It offers the advantage over the Rau and Ranade interleaves by employing a memory with $2^B$ banks, permitting efficient binary addressing and use of the memory for paging. Also, the abbreviated interleave pattern has the efficiency of the Rau and Ranade interleaves for interleaving partially accessed rows for accessing cache lines while not having an address apparatus needing to input all physical address bits to address rows.

SUMMARY OF THE INVENTION

The present invention is directed to shunted interleave patterns that are particularly useful for accessing plural memory banks for use with a cache. Shunted interleave patterns according to the present invention may be abbreviated ($Q < и$) or unabbreviated ($Q = и$) and Q may be odd or even but not a power of two, where $и$ is the number of memory banks.

In one form of the invention, a computer memory containing a plurality of individually and successively addressable memory banks is addressed using a bank select device that defines a plurality of offset interleave patterns. The bank select device comprises a plurality of addressable locations, and a plurality of storage locations. Each storage location is correlated to a respective one or more of the plurality of addressable locations and each addressable location is correlated to one of the plurality of storage locations. Each storage location contains a respective bank select for addressing a respective one of the addressable memory banks, there being at least as many storage locations as there are addressable memory banks. The addressable locations and storage locations are grouped into a plurality of interleave patterns such that, for each interleave pattern, there are Q storage locations and $2^A$ addressable locations arranged in L sequential loops each containing Q sequentially addressable locations and a single remainder loop containing R sequentially addressable locations, where $L > 0$, $L \cdot Q + R = 2^A$, $и \geq Q \geq 3$, $0 < R < Q$, and Q has at least one odd factor greater than 1. A shunt, S, defines an offset for each interleave so that each interleave commences with a different bank select and a complete rotation of all of the interleaves addresses each of the $и$ memory banks an equal number of times. The bank select device is responsive to an input address to an addressable location to choose the bank select from the correlated storage location, such that successive input addresses to successive address locations during execution of a respective interleave pattern choose successive bank selects.

The plurality of interleave patterns are organized so that bank selects are chosen to address a different set of Q memory banks during execution of different ones of the plurality of interleave patterns, and execution of a complete rotation of the plurality of interleave patterns addresses all of the plurality of memory banks. Address apparatus is responsive to the bank select device to address successive memory banks using the chosen successive banks selects.

In some embodiments, the shunt (S) is selected from the group consisting of $\mathrm{mod}(2^A, Q)$ and $-Q + \mathrm{mod}(2^A, Q)$ where S is $\pm 1$ or $\pm$prime to $и$. In some embodiments, values of A, Q and/or $и$ are adjusted to derive a desired value of S using a gain, G.

In some embodiments each memory bank is capable of storing data in a plurality data storage locations as rows of data such that each row has a plurality of individually addressable data cells and each memory bank is responsive to an access of a data cell to make at least the row of data containing the accessed data cell ready for a quicker additional access to the row's data cells than for an access to data cells in others of the rows of data. The apparatus further comprises a cache coupled to the memory for individually storing data from each of a plurality of respective data cells in respective rows in respective memory banks as respective individually addressable cache lines and for transferring altered cache lines to respective memory banks as data for storage in respective data cells in respective rows. A processor is coupled to the cache to execute instructions on data received from data elements in individually addressable cache lines of data and to send results of executed instructions as data elements to the cache for storage as data elements in cache lines to alter the data of respective cache lines.

A computer process is provided as another form of the invention to carry out shunted interleave patterns on a plurality of memory banks.

DETAILED DESCRIPTION OF THE PREFERRED EMBODIMENTS

A classic interleave distributes $2^{B+C-A}$ addresses of rows among $2^B$ banks at the rate of one address per bank for each rotation through all the banks, where $B \geq 1$, where $2^{C-\Lambda}$ is the total number of data blocks or rows addressed per bank, $2^C$ is the number of cells per bank, and $2^\Lambda$ is the number of cells per data block interleaved or row. The distribution as for any one rotation is repeated $2^{C-\Lambda}$ times for all memory. Thus, the B field of the address is ordered below all the C–Λ bits, and because field A has zero bits, the bank selection is a simple B-bit decoder to decode the value [B], the content of field B. The row selection is a simple (C–Λ)-bit decode, and cell selection is a simple decode of Λ bits.

The efficiency of the classic interleave employing eight memory banks is 67.2%, meaning that 67.2% of the banks, on the average, hold memory data of a large range of fixed stride values. But for accessing cache lines already partially accessed in bit addressed memories, rows of large power of two strides need to be well distributed among banks. For such accessing, a classic interleave does not do well because of having all rows of such strides in a single one of its banks. Efficiency for such accessing for eight classically interleaved banks is 12.5%, such poor efficiency causing each respective $1^{st}, 2^{nd}, 3^{rd}, \ldots$ or last data position of large blocks of data to be in only one of the eight banks. Thus, for applications accessing large blocks of data, there is a poor chance that a classic interleave will access a cache line from a row when the row is already partially accessed.

An interleave scheme with a greater efficiency for distributing respective same rows of large blocks is the Ranade interleave which employs an odd number of data banks greater than 2, an odd number of the form, $2^B-1$. In the context of a contiguous physical memory, the Ranade interleave would distribute every set of $2^B-1$ consecutive addresses of $(2^B-1)2^{C-\Lambda}$ total addresses of rows among the $2^B-1$ banks at the rate of one address per bank for each of $2^{C-\Lambda}$ repeats of the bank select pattern. The Ranade scheme employs an odd number of data banks ($2^B-1$) and interleaves data evenly and finely among all of the banks. Thus in the Ranade scheme all the B+C–Λ bits of the memory's row address are the respectively ordered bits summed by Ranade's pyramid of B-bit ones compliment adders. For all stride values, a Ranade interleave scheme employing seven banks has an efficiency of 87.8%, significantly better than the classic interleave. But, more importantly for addressing partially accessed rows for accessing cache lines, the Ranade technique has 100% efficiency for row-data of all powers-of-two strides. However, the Ranade interleave is unsuitable for paged memories when interleaving elements for direct access (not via a cache) where different pages of the same size preferably have the same interleave pattern. The Ranade technique is suitable where the physical memory is small and the interleaving of rows for accessing cache lines is more important than pages having different patterns. For interleaving rows, Ranade's addressing apparatus for generating bank selects must input all the bits of the entire physical address of rows, which contains too many bits for any reasonable Ranade's apparatus to have good performance if physical memory is large. Thus, the Ranade interleave is unsuitable for the memories found in most computers. Where the B field addresses data blocks at least as large as the largest pages for mapping virtual addresses and the F field of the address according to the present invention is relatively large for not being inputted by the addressing apparatus, a shunted interleave according to the present invention applied to the Ranade technique of $2^B-1$ memory banks ($и=Q=2^B-1$) becomes quite suitable for interleaving row addresses of large physical memories.

B.R. Rau's aforementioned paper also proposed a "prime degree" interleave which employs a non-unitary odd prime number of banks (3, 5, 7, 13, 17, ... ) in a manner similar to Ranade. While the efficiency of the Rau prime degree interleave is the same as that of the Ranade interleave and significantly better than the classic interleave, the use of an odd number of memory banks in the prime-degree interleave scheme described by Rau is unsuitable for paged memories and bit-addressed memories which require a power-of-two number of memory banks for having same sized pages be interleave the same. Rau offers no useable addressing apparatus for the prime degree interleave. Thus, the prime degree interleave becomes possible with the present invention where и equals Q which equals a non-unitary odd prime number.

As used herein, interleaves are defined by the number, и, of total interleaved banks and the number, Q, of banks accessed during a single simple rotation of one interleave. An interleave is odd if Q is odd; an interleave is even if Q is even. An interleave is unabridged if и is a power of two ($и=2^B$); an interleave is abridged if и is less than $2^B$ where $2^B=\text{ceiling}(\log_2 и)$. и may be even other than a power of two or odd in an abridged interleave (interleaves where и is a power of two are unabridged interleaves). An interleave is abbreviated if $Q<и$; an interleave is unabbreviated if $Q=и$. All abbreviated interleaves are shunted interleaves; unabbreviated interleaves may be shunted according to the present invention.

The present invention is directed to shunted interleaves where individual interleaves of a complete rotation of a plurality of interleaves are offset from each other in such a way that the first position of different ones of the plurality of interleaves addresses different ones of the и interleaved banks. The offset is defined by a shunt, S, to cause successive pairs of the и interleaves to have respective banks be shunted, S banks from interleave to next interleave. The interleaves may be odd or even, abridged or unabridged, and abbreviated or unabbreviated, but not even interleaves where Q is a power of two. Most preferred are odd abridged unabridged interleaves.

Each interleave of Q banks of the plurality of и shunted interleaves of all и banks according to the present invention contains $2^A$ representations, where $2^A$ is both the number of addressable rows distributed among all the Q banks for each interleave pattern of a rotation of interleave patterns and the number of addressable rows in each of all и banks for each rotation of all и interleave patterns, each of the и banks being a different one ($1^{st}, 2^{nd}, \ldots$) of the Q banks in respective Q of the и interleave patterns, each of the и interleaves having at least one bank in common with the fewer of either $2(Q-1)$ or $и-1$ of the other interleave patterns. Each individual interleave pattern of each complete rotation of the и interleave patterns comprises a plurality of L loops each containing Q representations of addresses to address Q banks. As explained in conjunction with FIG. 4, if any factor of Q is not a factor of $2^A$, there is also a single remainder loop of R representations of addresses ($0<R<Q$) to address the first R of the Q banks one additional time, such that $2^A=L \cdot Q+R$ where $R=\text{mod}(2^A,Q)$. If Q were to have only a factor of $2^A$ (that is, if Q were a power of two), there would be no remainder loop ($R=0$), in which case $2^A=L \cdot Q$. In this case, R equal zero, a shunt or a set of initial bank selects can not be applied to the interleaves so that the beginning bank addressed by each successive interleave pattern of the complete rotation of the plurality of interleave patterns is a different bank so that each bank is accessed equally ($2^A$ times) and used once each Q usages over the complete set of и interleave patterns. Whereas because Q has a factor>1 not of $2^A$, there is a remainder loop ($R>0$), in which case $2^A=L \cdot Q+R$. In this case, R not equal zero, a shunt or a set of skipped bank selects can be applied to the interleaves so that the beginning bank addressed by each successive interleave pattern of the complete rotation of the plurality of interleave patterns is a different bank so that each bank is accessed equally ($2^A$ times) and used once each Q usages over the complete set of и interleave patterns. Consequently, when shunted, the minimum period of bank usage remains Q during the transitions between successive interleave patterns.

Examples of abbreviated interleave patterns (Q<и) include:
- A 7/16 interleave pattern has Q=7 and и=16. Because 7 is odd and 16 is power of two, this abbreviated interleave pattern is odd and unabridged. Such interleaves are described in my aforementioned prior patent application in the context of accessing interleaved data elements from banks.
- A 12/16 interleave pattern has Q=12 and и=16. Because 12 is even and 16 is power of two, this abbreviated interleave is even and unabridged.
- A 6/7 interleave pattern has Q=6 and и=7. Because 6 is even and 7 is odd, this abbreviated interleave is even and abridged oddly.
- A 5/7 interleave pattern has Q=5 and и=7. Because 5 is odd and 7 is odd, this abbreviated interleave is odd and abridged oddly.
- A 5/10 interleave pattern has Q=5 and и=10. Because 5 is odd and 10 is even not power of two, this abbreviated interleave is odd and abridged evenly.
- A 6/10 interleave pattern has Q=6 and и=10. Because 6 is even and 10 is even not power of two, this abbreviated interleave is even and abridged evenly.

Unabbreviated interleave patterns include a 7/7 interleave, which is unabbreviated because Q equals и. It is also an odd interleave, because Q is odd and is abridged oddly because и=7. A 10/10 unabbreviated interleave pattern is even and abridged evenly.

There are two types of even interleave patterns, namely where Q is power of two and where Q is not a power of two although even. Examples of interleaves where Q is a power of two include 4/10 (abbreviated abridged even), 8/16 (abbreviated unabridged), 4/7 (abbreviated abridged odd), and 16/16 (unabbreviated unabridged). For reasons given below, interleaves where Q is a power of two (and the processor operates in binary), are not considered suitable for the present invention. Additional examples of interleaves where Q is even and not power of two include 6/10 (abbreviated abridged even), 10/16 (abbreviated unabridged), 6/7 (abbreviated abridged odd), and 6/6 (unabbreviated abridged even). Also for reasons given below, interleaves where Q is even and not power of two or is odd (any having an odd factor greater than one), and where the processor operates in binary, are considered suitable for the present invention.

For reasons similar to those given in my prior application, abbreviated interleave patterns are preferred over unabbreviated interleave patterns and odd interleave patterns (where the processor operates in binary) are preferred over even abbreviated interleave patterns. Also for reasons to be given herein and although less preferred than Q odd, Q being an even number having an odd factor larger than one is preferred as suitable for this invention. Most preferred are odd abbreviated unabridged interleaves where и=$2^B$ and Q is a prime number of three or more.

An interleave pattern (odd or even, unabbreviated or abbreviated, unabridged or abridged) is a shunted interleave pattern if a shunt value is applied so that initial bank selects of each of the plurality of interleave patterns is assigned to select a different bank (S≠0, where −Q<S<+Q) so the period of bank usage is Q during and between the Q interleaves using a bank.

Thus, all of the above exemplary interleave patterns of the invention are shunted if, for each example, S≠0 so that initial bank selects of each of the plurality of interleaves is assigned to select a different bank to maintain, during transitions between successive interleaves, bank usage as once each Q usages for banks common to the interleaves. The adjacent B and A address fields address the addressable locations 102, 104, 106, 108 of each interleave pattern and establish a single remainder loop so that bank usage for each of all (и) memory banks is only once each Q usages during each of the (Q of all и) interleaves which use the bank.

The classic interleave pattern and Rau's pseudo random interleave pattern, such as a $2^B/2^B$ interleave that has A=0, Q=$2^B$, и=$2^B$ and S=0, are unshunted (not shunted) interleaves. Each rotation of both the classic and Rau's pseudo random interleaves is of all of the interleaved banks of the memory for the same address of data per bank because A=0 and, because S=0, each rotation commences at the same bank or, if Rau, a bank swapped for the bank. Again Q is the minimum period of bank usage for the Ranade interleave also being unshunted because the addressing apparatus of Ranade employs adders and natural adder wraparound to produce a single simple rotation of the bank selects for all addresses interleaved which works only for и=Q=$2^B$−1 and Γ=0. For Rau's prime degree interleave, Rau implies only a single simple rotation of the Q bank selects as for A=0, where Q=и where Q and и are prime numbers.

Figure 1:
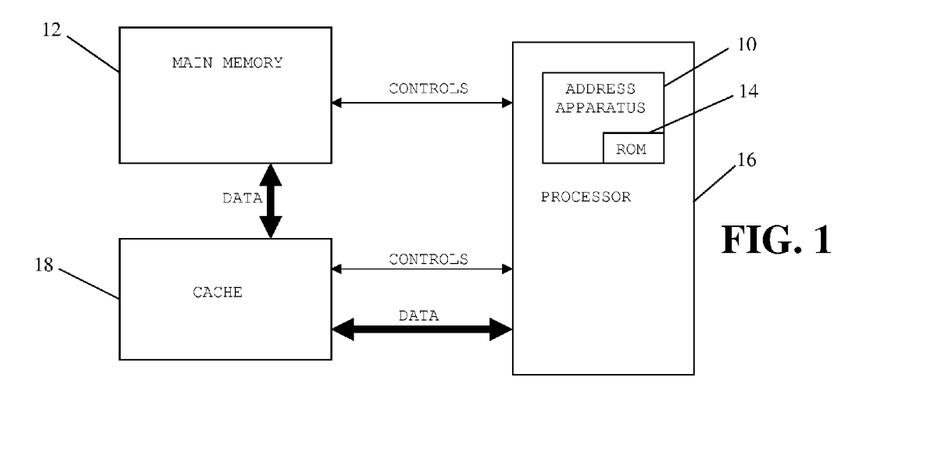
FIG. 1 is a block functional diagram of a computer processor system employing the accessing techniques of the present invention.
Figure 2:
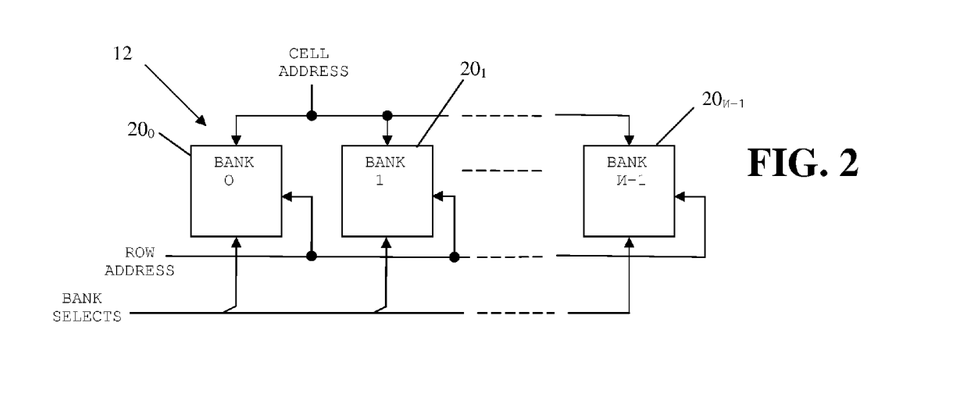
FIG. 2 is a block functional diagram of a main memory used in the computer processor system of FIG. 1.

FIG. 1 is a block diagram of a computer processor employing the interleave memory addressing techniques according to the present invention. Address apparatus 10 holds physical addresses 11 (FIGS. 4 and 5) having at least four fields: a Λ-bit fixed sized field Λ containing a value [Λ], an A-bit fixed sized field A containing a value [A], a B-bit fixed sized field B containing a value [B], and a Γ-bit fixed sized field F containing a value [Γ]. For sake of simplicity, all embodiments of the invention assume that each individually accessible data cell is identical in size and that each memory bank contains the same number ($2^C$) of cells. The value [Λ], when decoded as an address, defines the cell select of a data cell within a row of a bank 20 (FIG. 2), such as a cell for storage of data of a cache line, there being $2^Λ$ data cells in each row. For example, if there are 32 data cells per row, then the Λ field contains 5 address bits to define 32 data cell selects per row. The values [A] and [Γ], when concatenated and decoded, define the row address values for addressing individual rows of a bank 20. Γ+A equals Я. There are $2^Я$ rows per bank, so each decoded row address value selects one of the $2^Я$ rows of a bank. The values [A] and [B] are used by bank select device 14, which may be a relatively small read-only memory (ROM), to generate и bank selects for each selecting an individual bank 20 (FIG. 2). Since $2^{B−1}$<и≦$2^B$, there are more than $2^{B−1}$ and up to $2^B$ bank selects to select each one of the и banks. Together, the decoded row addresses and bank select values address a single row in a single bank for being partially accessed if not already partially accessed, and together with the decoded cell select, they address a single cell for being accessed in the single row in the single bank of memory 12.

Processor 16 contains address apparatus 10 containing bank select apparatus 14 responsive to address 11 for selecting banks in main memory 12. As shown particularly in FIG. 2, memory 12 comprises a plurality of и individually addressable memory banks $20_0$, $20_1$, . . . , $20_{и-1}$, where $2^{B−1}$<и≦$2^B$, and B is an integer, ceiling($\log_2$и). Cache 18 is coupled to memory 12 to receive blocks of memory data from data cells in the form of cache lines from memory for storage in cache 18 as cache lines. Cache 18 is also capable of transferring cache lines to main memory for storage as data in cells. Processor 16 exchanges certain control and select signals to both main memory 12 and cache 18 and exchanges data with at least cache 18. Optionally, processor 16 may exchange data directly with main memory 12 for both it and cache 18 receiving a cache line from memory.

As shown in FIG. 2, bank selects from ROM 14 in address apparatus 10 address memory 12 to select respective ones of banks $20_0, 20_1, \ldots, 20_{и_{-1}}$. Address apparatus 10 also supplies row selects and cell selects to select respective ones of rows $0, 1, \ldots, 2^я-1$ and ones of cells $0, 1, \ldots, 2^A-1$ of the selected respective bank 20.

Figure 3:
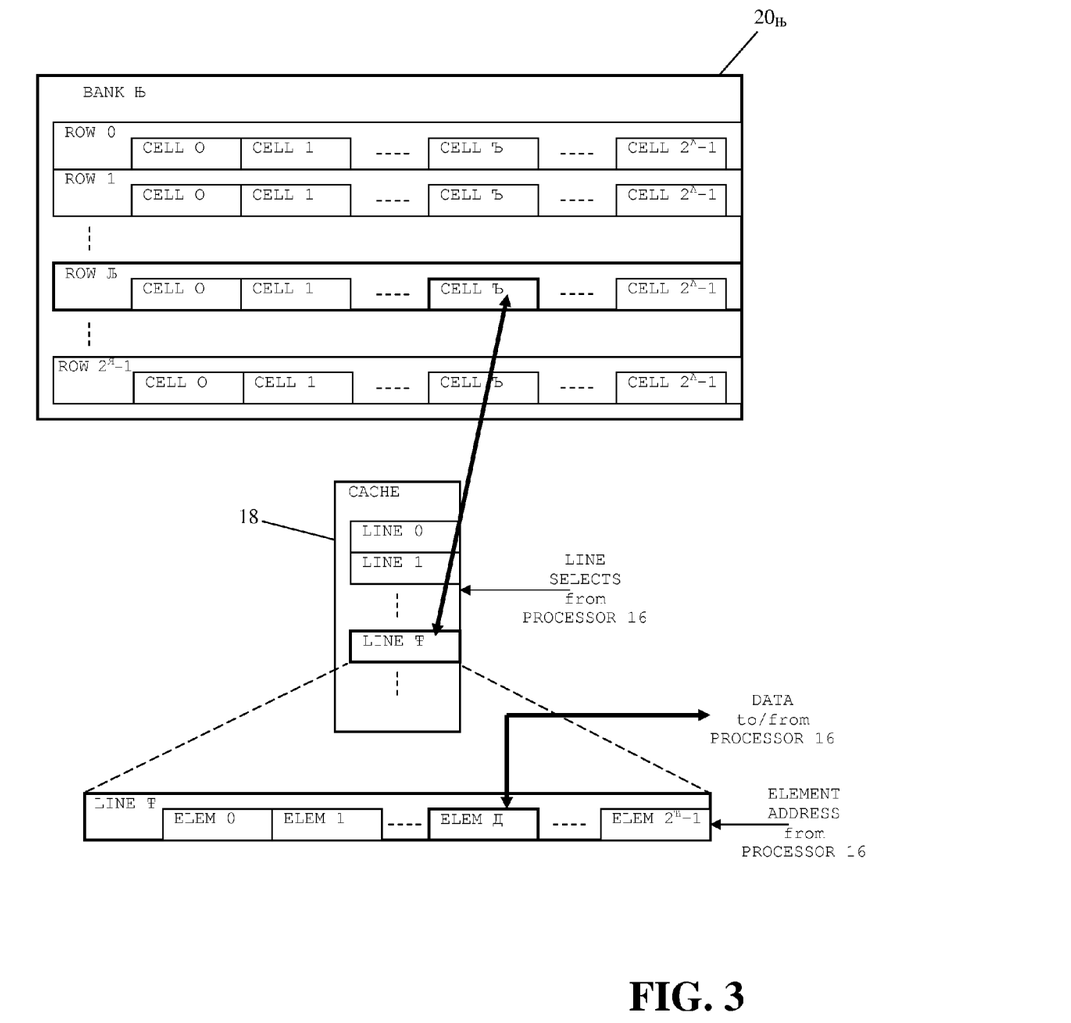
FIG. 3 is a block functional diagram illustrating transfer of data for cache lines between the cache and rows within banks of the main memory of FIG. 1 and transfer of elements between the processor of FIG. 1 and cache lines within the cache.

As shown in FIG. 3, each bank 20 of memory 12 contains a plurality of rows $0, 1, \ldots, 2^я-1$, each containing a plurality of cells $0, 1, \ldots, 2^A-1$. In preferred embodiments, each bank is capable of partial access of an entire row of the respective bank. Upon receipt of an address of a row and data cell (value [Я,Л]) within a selected bank 20; the bank partially accesses the entire row in which the data of the addressed cell is located. More particularly, the address apparatus 10 provides an address 11 to choose a bank select from ROM 14 to select one of banks $0, 1, \ldots, и-1$. Address 11 is used to provide a row select to address and select one of the rows $0, 1, \ldots, 2^я-1$ within the addressed bank, while also providing a cell select to address and select one data cell $0, 1, \ldots, 2^A-1$ within the addressed row of the addressed bank. A copy of the data from the addressed data cell is transferred to cache 18 for storage therein as a cache line. If not already, then additionally, the bank partially accesses the row containing the addressed data cell. Where a bank $20_h$, has one gigabyte ($2^{30}$ bytes) of storage for containing $2^{18}=262,144$ rows $0, \ldots, 2^я-1$ each containing 32 data cells $0, \ldots, 2^A-1$ each having 16 64-bit data elements $0, \ldots, 2^в-1$, receipt of an address for addressing and accessing one of the bank's $2^{18+5}$ data cells $0, \ldots, 2^{я+A}-1$ will activate the one row Љ within the selected memory bank $20_њ$ containing the addressed data cell Ђ and will transfer all 16 data elements $0, \ldots, 2^в-1$ from cell Ђ in row Љ of bank Њ to cache 18 for entry as respective elements $0, \ldots, 2^в-1$ at line Ҭ as a cache line.

As shown in FIG. 3, all the data of one data cell Ђ containing the one addressed data element will be copied from row Љ in bank $20_њ$ to cache 18 for storage as a single cache line Ҭ of $2^в$ data elements, including the one data element addressed, element Д. The line select for line Ҭ in cache 18 from processor 16 is linked with the virtual address mapped to the physical address in address 11. That one data element, and the $2^в-1$ other data elements in data cell Љ, are now also stored in cache line Ҭ and may then be addressed directly from cache by processor 16 employing a virtual address linked line select that matches the line identification for a line Ҭ and includes a data element select for selecting an element Д of $2^в$ data elements, as diagrammatically shown in FIG. 3. The entire group of $2^в$ data elements of a cache line remains in cache 18 for later access by processor 16 until the cache line needs to be replaced by another to come from memory because it is the one currently in cache 18 which is least recently used and therefore is either discarded if not altered or copied back to memory 12 if altered. If a bank can have only a single active row at a time, then the entire row Љ of $2^A$ data cells remain partially accessed in the respective bank $20_њ$ for additional quicker accesses of data cells of row Љ until another access to bank $20_њ$ accesses a data cell in another row as for another cache line for accessing another element.

If cache 18 retains cache lines on a recently-used basis, then when the cache becomes full, a next cache line to be copied from memory 12 replaces the cache line that had not been accessed for the longest period of time. Thus cache 18 would always contain some number more than Ҭ of the cache lines most recently-accessed for elements by the processor. In the event that data in a cache line are altered, such as due to a processing result to be stored to memory by processor 16, the altered data are stored in the respective cache line with a flag, sometimes called a "dirty bit", that indicates the data within the cache line has been altered from the copy in the respective data cell in the respective row of the respective bank 20. Before being discarded, such as when being replaced by a new cache line, the altered cache line is copied back into memory 12 at the respective cell, row and bank from which it was copied into cache before becoming dirty. In some embodiments if the row is already partially accessed, the altered cache line is stored back to the memory bank more quickly than if the row is not already partially accessed.

In preferred embodiments there are $2^B$ banks. For banks containing 32 data cells per row, there are as many as $32 \cdot 2^B$ partially accessed data cells in main memory 12. Thus, if memory has 16 (B=4) banks 20, there are up to 512 partially accessed data cells which can hold enough data for 512 cache lines, and if each cell has 16 elements, up to 8,092 partially accessed elements in main memory 12.

Figure 4:
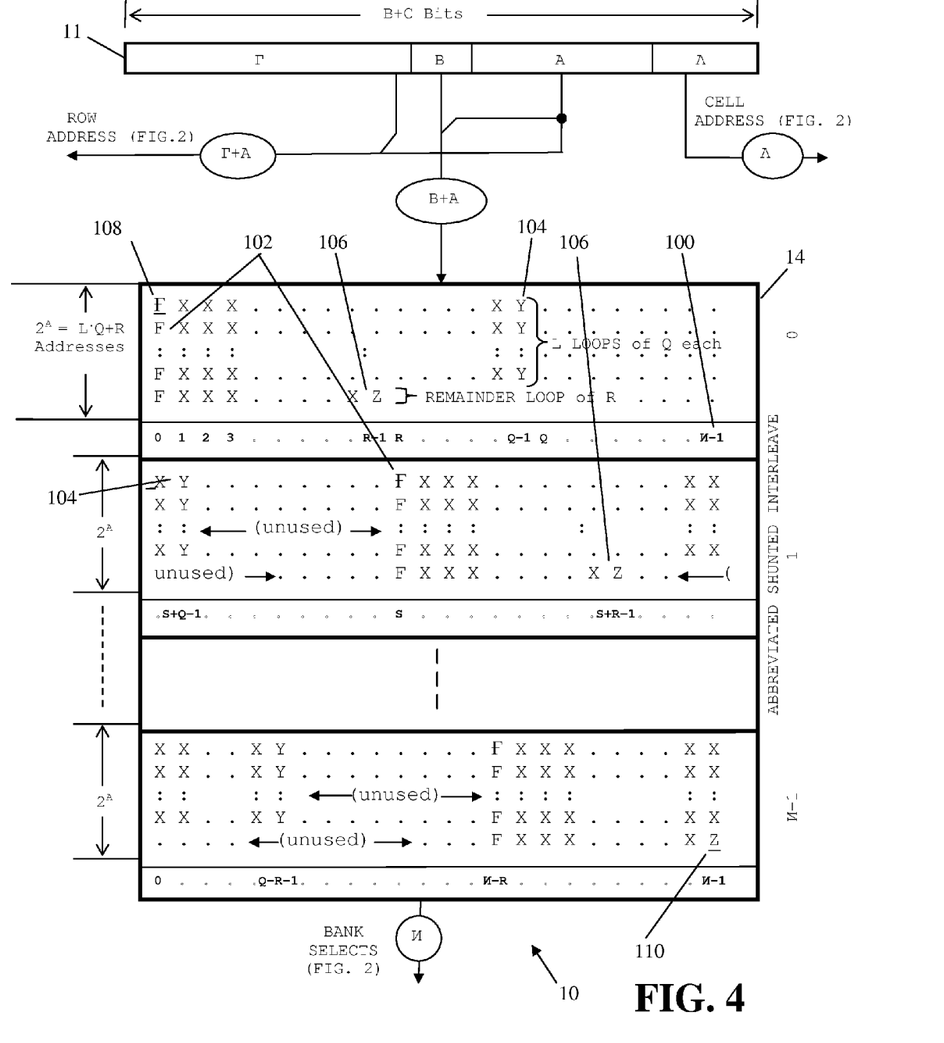
FIG. 4 is a functional diagram showing addressing apparatus for generating bank select values for abbreviated shunted interleaves for the apparatus shown in FIG. 1.
Figure 5:
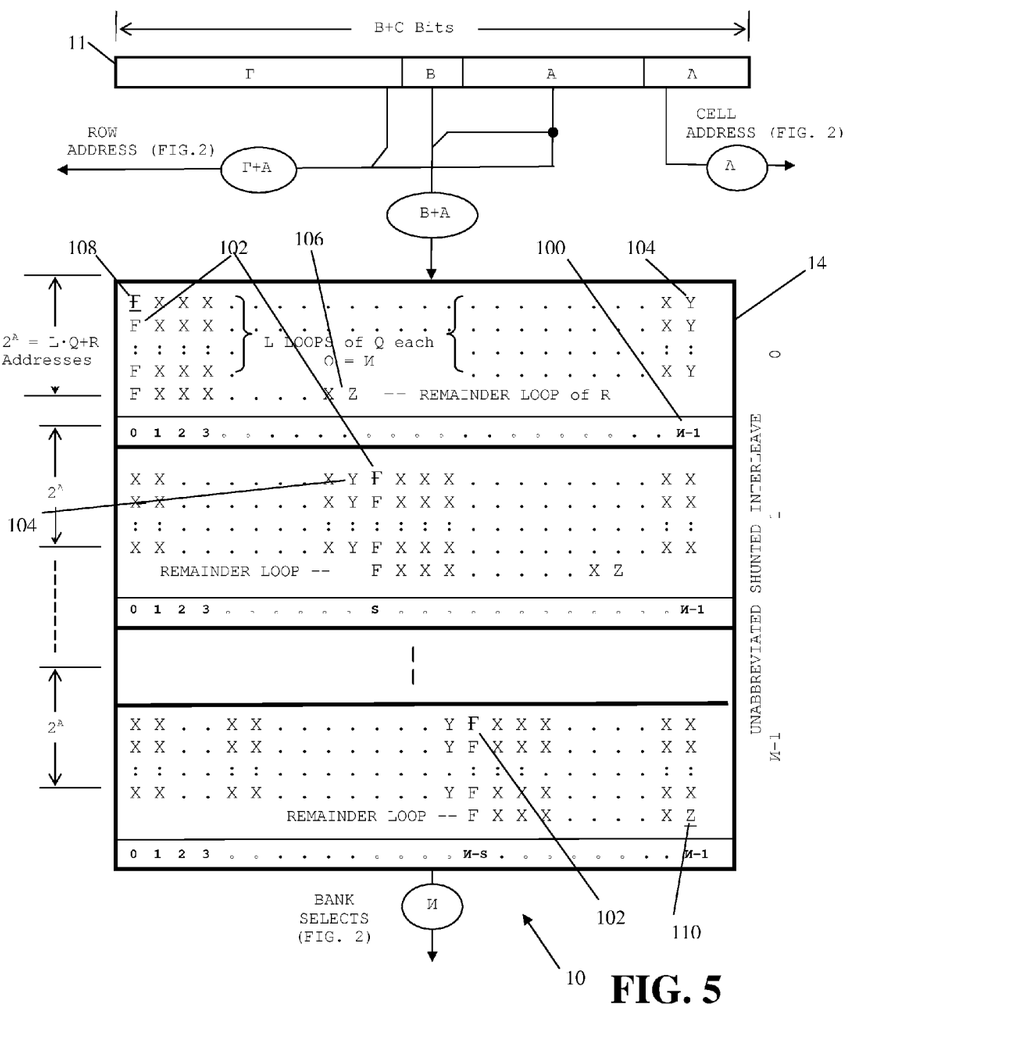
FIG. 5 is a functional diagram, as in FIG. 4, showing addressing apparatus for generating bank select values for unabbreviated shunted interleaves for the apparatus shown in FIG. 1.

FIG. 4 illustrates address apparatus 10 that includes a lookup table stored in read only memory (ROM) 14 for a rotation of abbreviated interleave patterns where Q<и. The table defines sub-tables of loops of positions or locations arranged in lines (left and right alignments) and columns (up and down alignments) representing successive abbreviated interleaves $0, 1, \ldots, и-1$, where и is the number of banks 20 in memory 12 and thus, also the number of interleave patterns or sub-tables. Each sub-table represents the simple rotation of bank usage of one abbreviated interleave of the rotation of abbreviated interleaves. A sub-table is selected by a value of [B] (e.g., $0, \ldots, и-1$) from address 11. Each sub-table contains $2^A$ sub-table positions arranged in columns and correlated to a bank select in each column. Each bank select is correlated to either L or L+1 of the sub-table's loops according the occupied height of a bank's column having positions of Ҭ, F, X, dot (.) implying X, Y or Z. Each of the $2^A$ positions of each sub-table contains a representation of a respective one of the $2^A$ storage location addresses in one of the Q banks of the interleave of the sub-table. The representations and bank selects are arranged in the plurality of и sub-tables, each of $2^A$ representations, so that each of the и banks is represented $2^A$ times by each rotation through the sub-tables for $2^Г$ such rotations to address all $и \cdot 2^{Г+A}$ storage locations in all и banks. The particular value of [A] for a particular position of a representation shown in a sub-table is Q times the number of loops of the sub-table above where shown plus the number of positions occupied by the sub-table left (with wraparound as needed) of where shown to and including the first position, either position Ҭ or F of the loop. For example, position Ҭ of a sub-table, FIGS. 4 and 5, corresponds to [A]=0·Q+0=0 because it has no loops above and no occupied positions left of it, whereas, position Z, FIGS. 4 and 5, corresponds to [A]=L·Q+R−1 because it has L loops above and R−1 positions left of it to and including position F, all this for the loop where shown, the remainder loop. While in preferred embodiments $и=2^B$, in other embodiments и may be any number not a power of two greater than or equal to 3. Q is an integer and in preferred embodiments is odd, in other embodiments it may be an even number having an odd factor greater than one. In some embodiments, Q=и as shown by FIG. 5, but in preferred embodiments, Q<и as shown by FIG. 4.

The line immediately below each sub-table identifies и relative bank select values 100, identified in left to right order as values $0, 1, 2, \ldots, и-1$, some specifically, some in expressions of Q, R, S, or и, and some implied by dots. The relative bank select values are ordered identically for all sub-tables. The illustration of each sub-table of FIG. 4 as containing и columns, each corresponding to a respective one of the и relative bank select values, is for convenience of explanation, and those skilled in the art will recognize that those columns containing bank selects not used for a given sub-table, or interleave, may be omitted in practice.

In the embodiment of FIG. 4, each of the и abbreviated interleaves has L full loops of Q consecutive positions or locations with the top loop being first and the bottom last being the remainder loop containing R consecutive locations, where 0<R<Q, 2<Q<и, Q≠a power of two (a factor of $2^A$), and $2^A$=L·Q+R. In preferred embodiments, Q is an odd integer, most preferably a prime number 3, 5, 7, 11, 13, 17, . . . , greater than 2 and less than и. The first location of each loop of a sub-table and thus of an interleave is in the same column. There are Q locations for each of L loops for each of и interleaves of the whole table specifying the number of contiguous (with wraparound as shown by relative bank select 0 following и−1) and selectable memory banks in any one of the L loops of each of the и interleaves. A different relative bank select value 100 is associated with each of the Q locations (a bank select is shown at the bottom of each column); likewise for R locations of each remainder loop of each of и interleaves.

For purposes of explanation, the first location 102 of each loop of Q or R locations is designated F or F, with the first location of the first loop of each abbreviated interleave being F. The last location 104 of each loop of Q locations is designated Y, the last location 106 of a loop of R locations is designated Z and each location between a first and last location of each Q or R locations is either explicitly designated or implied (dots between Xs) to be X. Each letter F, F, X, Y, Z represents a different value, allowed value of [B,A], of the lower order B+A bits of a data (row) address from address 11. Successive next values of [B,A] are from left to right within loops and top to bottom between loops with wraparound, 0 of location F 108 following (и·$2^A$)−1 of location Z 110, [B,A] not allowed where и·$2^A$≦[B,A]<$2^{A+B}$. The B-bit relative bank select values 100 are arranged commonly across all и columns of all sub-tables (same column is for same bank select for each interleave regardless of notation differences), so that each allowed B+A-bit address (value) from address 11 represented by a letter F/F,X,Y/Z in each loop L and R in each sub-table corresponds to a respective bank select value 100.

Fields Γ and B are all the bits of the physical address 11 for identifying blocks of data as large as or larger than one of the memory's largest pages for virtual addressing. In order that bank select 14 has the least number of individually addressable data cells, all physical address bits of address 11 in field Γ and B are preferably all that are needed to identify a particular one of memory's largest pages for virtual addressing. By having more A field bits and fewer Γ field bits, it is permissible to include more cells for holding bank select values in ROM 14, at the cost of increasing the size of the ROM.

The A+B bits from fields A and B of physical address 11 address и·$2^A$ respective ones of the $2^{A+B}$ cells of ROM 14. Thus, the B-bits select one of the more than $2^{B-1}$ up to $2^B$ interleaves (or и sub-tables) and the A-bits select one of the $2^A$ representations within the selected interleave. As shown in FIG. 4, the output of ROM 14 is an и-bit set of already decoded bank selects each respectively selecting only one bank and all respectively selecting the banks one at a time. Optionally, ROM 14 could output bank encoded select values for having fewer output bits, B bits, but then a decoder would be required and additional delay incurred.

Since, in the case illustrated in FIG. 4, the number of address representation locations in each loop is either Q or R, and is less than the total number (и) of columns across each sub-table, the addresses in each sub-table correspond to some set of at least 3 and less than all (и) of the bank selects. Each of the и sub-tables represents one of и abbreviated interleaves (interleave 0, interleave 1, interleave 2, . . . , interleave (и−1)), namely each interleave number being one of the allowed values of field B where B=ceiling($\log_2$и) and B is the number of bits of the B field specific to selecting the и sub-tables. Whereas, all values of field A are allowed for L·Q+R=$2^A$ where A is the number of bits of the A field specific to the particular pattern of $2^A$ bank selects of Q banks of each sub-table. Across and below its remainder loop, each sub-table additionally illustrates the и possible bank selects for all sub-tables. The collection of representations of the $2^A$ banks selects of each sub-table collectively represent each of the $2^Γ$ sets of $2^A$ rows of 1/$и^{th}$ of the sets of all of the rows of data cells of all of the memory, which particular 1/$и^{th}$ being one of и of all memory according to the value of [B] of field B of the memory address being one of its и allowed values, 0, 1, . . . , и−1.

A given row of the и·$2^{Γ+A}$ rows of all memory selected according to the value, [Γ,B,A], of fields Γ, B and A, along with the Λ bits of field A specific to $2^Λ$ cells of each row, specifies cell Ђ (FIG. 3) of row Љ of bank Њ addressable by address 11. A single bank select value 100 corresponds, and therefore is correlated, to all address values represented in the same column so that matching an address value represented by a letter in the table to a concatenated address value [B,A] from address 11 selects a corresponding B-bit relative bank select value 100 from the same column for having its и-bit decode output from ROM 14 to memory 12 (FIG. 2).

As shown particularly by comparison of abbreviated interleaves 0 and 1, the first position shown by F of the first loop of Q in any sub-table (such as interleave 1) is at some different column from the column of the first position F of the just prior abbreviated interleave or next higher sub-table (with top to bottom wraparound for interleave и−1 being just prior to interleave 0). In preferred embodiments which have minimum period of bank usage=Q, and as shown in FIG. 4 for showing S equaling mod($2^A$,Q) which is R, the first position F of a subsequent abbreviated interleave is in some position determined by shunt S relative to the first position F of the prior interleave.

The first positions, F and F, of the loops of each sub-table, and hence each abbreviated interleave, are offset from the first positions, F and F, of the loops of the immediate prior abbreviated interleave by shunt S. In preferred embodiments, shunt S is determined as S=mod($2^A$,Q), if $2^A$ modulo Q is +1 or a positive prime to и, if a resulting value for G is large enough,    [1]

or S=−Q+mod($2^A$,Q), if −Q+($2^A$ modulo Q) is −1 or a negative prime to и if a resulting value for G is large enough.    [2]

If each of equations [1] and [2] produces a valid value for S, then preferably S is chosen as the valid value of [1] or [2] closest to zero. If neither equation [1] or [2] provides a valid value for S, then a gain value, G, is identified to adjust the values of one or more of A, Q and и to iteratively determine a value for S using equations [1] and [2]. If the shunt value is determined as S=+1, the first positions F of each loop of each of the plurality of interleave patterns 0 through и−1 will choose bank selects 0, 1, 2, . . . , и−1, respectively. If S is a positive number prime to и, the first positions F of each loop of each of the interleave patterns 0 through $и-1$ will choose bank selects 0, R, mod(2R,$и$), mod(3R,$и$), . . . , mod(($и-1$)R, $и$), respectively. If S is a negative number prime to $и$, the first positions F of each loop of each interleave pattern will choose bank selects 0, $и$-(Q-R), $и$-mod(2(Q-R),$и$), $и$-mod(3(Q-R),$и$), . . . , $и$-mod(($и-1$)(Q-R),$и$), respectively. If S=-1, the first positions F of each loop of each interleave pattern will choose bank selects 0, $и-1$, $и-2$, . . . , $и$-($и-1$) or -1.

Where Q<$и$ and the period of bank usage is Q during and between interleaves using a bank, the gain value, G, can be determined as a measure of how large a stride can be to have the $и$ interleaves remain as of a simple interleave of Q banks. For strides larger than G/Q (both respecting addresses interleaved), the interleaves begin periods of transitioning from as of Q banks to of $и$ banks back to as of Q banks, the interleaves behaving the same for strides differing by multiples of $и \cdot 2^A$. G is not often a concern in cases where the size in rows of the largest page for mapping virtual addresses is not more than $2^A$; the largest page size in rows also being the largest stride (also in rows) which is the usual threshold immediately before concern for G. But having A be smaller is an opportunity for also having a smaller ROM 14. For having a smaller ROM 14, if Q<$и$, period of bank usage is Q during and between interleaves using a bank, and $и=2^B$, $2^A$ can be less than largest page size in rows if G is equal to or greater than the largest page size in rows where $$G=Q+\mathrm{mod}((и-Q-R+1),S)+\mathrm{trunc}((и-Q-R+1) \div S) \cdot 2^A$$
if S is positive, or $G=R+1+\mathrm{trunc}((Q-и) \div S) \cdot 2^A$ if S is negative.

Thus, the numerical value of G can be used in some cases to reduce the required size of the A field, reducing the field by some number of bits until just before G becomes less than largest page size in rows. Generally with each reduction, S must be readjusted to a different preferred value because the most preferred evaluations for S are functions of A, namely S=mod($2^A$,Q) and S=-Q+mod($2^A$,Q). Also, where Q is not much smaller than $и$ and a preferred S is not near to zero (near floor(Q/2) from zero), G may show the A field needs an additional bit.

Conveniently, the process of adjusting A (as well as Q and/or $и$) for G can be accomplished with the aid of a spread sheet. Alternatively, a set of three-dimensional graphs could be used, each representing a different value of interest of some fourth variable being least considered for change, such as $и$. Each graph has A and Q for values of interest as the X- and Y-coordinates and G as the Z-coordinate where G can be considered to be of no interest and set to either $2^A$ or zero where not defined (either Q=$и$ or minimum period of bank usage is less than Q). The graph with the largest G for interest ranges indicates the values of A and Q along with its $и$ value together providing a best value for S. The minimum period of bank usage equals if (S<R,R-S, if (Q-S>$и$,R+Q-$и$-S, if (Q>S,R+Q-S, if ($и$-S+R<Q,$и$-S+R,Q)))).

Each bit of reduction or expansion reduces or increases the size of ROM 14 by half or double, which can be very significant. Where Q=$и=2^B$ for S=0, field A may be reduced any amount because bank usage transitioning from once each Q to once each $и$ is no change. In such a case, if A becomes zero, then interleave becomes a classic interleave. Where $и<2^B$, the expression for G is valid and might indicate a reduction, but field A ought not be reduced to $2^A$<largest page because to do so may cause discontinuities in the usable address spaces of largest pages.

It will be appreciated that the computation of S can be applied to unabridged interleaves as well as abbreviated interleaves. Thus selection of the equation or method of determining S for both abbreviated and unabbreviated interleaves can be summarized as follows:

For an odd/unabridged/abbreviated interleave pattern where $и=2^B$, and $Q_{odd}$<$и$, one of the two equations [1] or [2] for determining S can always be used and the other can not, depending on the values of A, B (for $и$) and Q. For example, for A=20, B=3 for $и$=8, and Q=7 (7/8 interleave), equation [1] provides an invalid value of S=4, whereas equation [2] provides a valid value of S=-3 which is prime to 8; for A=21, B=4 and Q=7 (7/16 interleave), equation [1] provides a valid value of S=1, whereas equation [2] provides an invalid value of S=-6 which is not prime to 16. G for A=20, Q=7 and B=3 shows either A needs adjusting to 21 where S becomes +1 or S needs adjusting closer to zero to -1 if minimum period being only 5 is acceptable; no adjustment is needed for A=21, Q=7 and B=4.

For an odd/abridged-oddly/unabbreviated interleave pattern where $и_{odd}<2^B$, $Q_{odd}=и_{odd}$, equations [1] and [2] each gives a valid value for S. For example, for A=20 and Q=$и$=9, equation [1] provides a valid value of S=4 and equation [2] provides a valid value of S=-5, both being prime to 9, both resulting in minimum period of bank usage equal to Q, S=4 being nearer to zero than S=-5 (actually, where Q=$и$, each S value is the same offset modulo $и$ and so produces exactly the same interleave).

For an odd/abbreviated/abridged-odd interleave pattern, none, one or both results of equations [1] and [2] may be useable. If neither equation [1] or [2] arrives at a solution, then one or more of A, Q and $и$ are adjusted for a second iteration. For example, where A=20, $и$=77 and Q=43, equation [1] will result in the invalid value S=21 which is not prime to 77, equation [2] will also result in the invalid value S=22 which is also not prime to 77; so adjustment of A to 21 gives S=-1. Where A=20 for a largest page size of $2^{20}$ rows, $и$=9 and Q=7, equation [1] will result in the valid value S=4 which is prime to 9, but equation [2] will result in the invalid value S=-3. Nevertheless, A needs adjusting because G=10 is too small (G<largest page for virtual mapping). Adjusting A to 21, S becomes +1 and G becomes greater than $2^{20}$ and thus, greater than largest pages, which is more than large enough to be not too small. Where A=20, $и$=11 and Q=7, equation [1] will result in the valid value S=4 and equation [2] will result in the valid value S=-3, both being prime to 11, both having minimum usage of Q, -3 where G is adequate (>$2^{20}$) being nearer to zero than +4 where G=8.

For an odd/abbreviated/abridged-even interleave pattern, neither or one of equations [1] and [2] will result in a valid shunt value, S. Thus, where A=20, $и$=12 and Q=7, equation [1] will result in the invalid value S=4 and equation [2] will result in the invalid value S=-3, each being a factor of 12, so S is solved as described above. Whereas, if $и$=10, equation [1] gives the invalid S=4, whereas equation [2] gives the valid S=-3. Noteworthy, in this example, the results of equations [1] and [2] can never both be prime to an even $и$ because the result of one of the equations will always be even.

For an even/abbreviated/abridged-odd interleave pattern, neither, one or both of equations [1] and [2] will result in a valid shunt value, S. Thus, where A=20, $и$=45 and Q=22, equation [1] will result in the invalid value S=12 and equation [2] will result in the invalid value S=-10, both not being prime to 45. Therefore, S needs to be adjusted as described above. Where A=20, $и$=15 and Q=10, equation [1] gives the invalid S=6 due to the common factor 3, whereas equation [2] gives the valid S=-4. A further adjustment to A=20, $и$=7 and Q=6, results in equation [1] giving the valid S=4 and equation [2] giving the valid S=-2, both being prime to 7, but neither results in a valid G at least as great as the preferred minimum size of G≧$2^A$ or =$2^{20}$. (Noteworthy here is that S=−2 results in minimum usage being less than Q, whereas S=4 and S=−3 each result in minimum usage of Q. Thus, −3 being nearer to zero than 4 means S=−3 would be preferred except that the value of G is too small. G is too small because S=−3 is not a result of equation [2] which is required (but not sufficient) for usage to be exactly Q to thereby allow G to possibly be large enough (not too small). Only S of equation [2] can sometimes result in minimum period of bank usage being less than Q. S of equation [1] always results in period of Q. S other than of equations [1] and [2] always results in usage not always Q and therefore, G being too small. For knowing what's occurring, unexpected minimum usage should be checked for a negative S along with G being checked for both positive and negative S.)

In the cases of the even/abbreviated/unabridged (6/8), even/unabbreviated/unabridged (16/16), even/unabbreviated/abridged (6/6) and even/abbreviated/abridged-even (4/6) interleave patterns, equations [1] and [2] will not supply a valid value for S because both Q and и are even. Therefore, the shunt value is determined by adjusting one or more of Q and и so than either or both are odd before proceeding as described above.

In all cases, the offset, when applied to the и interleave patterns of a complete rotation, assures that each bank $20_0$, $20_1$, ..., $20_{и_{-1}}$ (FIG. 2) addresses each of its rows (the bank's $2^{\Gamma+A}$ or $2^и$ rows) once over all ($2^\Gamma$) complete rotations of interleaves, И·$2^A$ rows each complete rotation.

If the consecutive table positions representing R and/or Q addresses reach beyond the bounds of the right-most column of bank select value и−1, each sequence wraps around to the beginning of the same line as in the same loop from the и−1 to the 0 valued position, as shown in sub-tables of interleaves 1 and и−1. In any case, it will be appreciated that there will be и−Q unused positions in each line with a loop containing Q addressed positions and there will be и−R unused positions in each line with a remainder loop.

It will be appreciated that the total number of addressable locations in the Q and R sequences on each interleave pattern is L·Q+R, and that the Q and R sequences of letters represent $2^A$ addresses of [A] as 0, 1, 2, ..., $2^A$−1 of the corresponding interleave of any rotation so aligned (parameter F=0). Thus, $2^A$=L·Q+R. Thus, each letter F,F,X,Y,Z represents a (B+A)-bit address input to ROM 14 where a corresponding и-bit bank select is stored. Also, each of the и bank select values of the и columns indicates which one of the и outputted bank select bits is the only bit set to select a bank of any rotation so aligned (parameter K=0). The shape of the two-dimensional layout of letters in FIG. 4 reveals bank usage frequency and sameness by address groups and interleave groups (which Q of и banks used).

As shown in FIG. 4, the rotation commences with interleave 0 at the uppermost letter F (at reference numeral 108) and sequences left to right through each loop and top to bottom through the loops of the first interleave, including the remainder loop, ending with Z at reference numeral 106. The next sequential letter in order after Z of interleave 0 is F at reference numeral 102 of the top loop of the next interleave, 1. The sequence continues through the each interleave, with wraparound as necessary, with the location of the letters F of each successive interleave offset by S positions (columns) from those before.

As for $S_{positive}$, the position of F of a next rotation is offset right by +S from the position of F of the last interleave of the prior rotation; conversely left instead of right for $S_{negative}$. The position of each F or F of each of the rotations is the same.

In FIG. 4, shunt S is shown as a positive offset equal to R or $2^A$ modulo Q. The Z of the last position of the last interleave pattern of a complete rotation of the interleaves is at the и th column (relative bank select и−1). The beginning positions F and Fs of the last interleave pattern are R−1 to the left of Z in the (и+1−R)th column (relative bank select и−R), making F and Fs of the first interleave pattern in the 1$^{st}$ column be R (S for S=R) to the right (with wraparound) from F and Fs of the last interleave. This occurs because a positive S equaling R is applied to beginning column of last F to locate beginning column of following F. Consequently, where a single S value suffices, all interleave patterns are offset equally from one to the next, and as is the case for S=R (and also S=−Q+R), relative bank usage order is maintained most efficiently in transitioning from one to the next interleave, including transitioning from the last position Z of the last interleave at relative bank select и−1 to the first position F of the first interleave at relative bank select 0, all in rotational order with wraparound.

The data content of ROM 14 produces at least one period of the smallest repeated pattern of bank usage aligned in the form of a rotation of interleaves. The value of S establishes the offset which progressively positions the common same relative pattern of each successive interleave 0, 1, ..., и−1 (numbers vertically annotated along the right side of ROM or bank select 14, FIG. 4). The bank selects generated by bank select 14 can be defined as mod(mod([A'],Q)+[B']·(S+и), и) where [A']=mod([A]−F+$2^A$,$2^A$) and [B']=mod(floor(mod([B,A]−F+$2^{A+B}$,$2^{A+B}$)/$2^A$,1)+K+и,и), and where, for address values of successive physical addresses having fields A and B, the value [B] increments from 0 to и−1 and then wraps around back to 0 with a carry into the lowest order bit of field Γ. It is preferred that system software not map a page of virtual addresses into a physical address where [B] becomes any value more than и−1 and less than $2^B$ where B=ceiling(log base 2 of и). The value of the F parameter (as for [A] represented by position F) is set to the desired [A] value for the starting position 108 of the first interleave pattern of the complete rotation of interleave patterns and causes each of the shunted interleaves to begin with a value for [A] for table position F for selecting a respective relative bank select (e.g., respective bank select 0 being selected by position 108) of the $2^A$ positions of the interleave (0≦F<$2^A$). K causes the и relative bank selects of the table of shunted interleaves of ROM 14 to be in an order as for actual values starting with the first column and continuing through the last column selecting bank mod(0+K+и,и), bank mod(1+K+и,и), bank mod(2+K+и,и), ..., bank mod(и−1+K+и,и), where 0≦K<и. For example for K=0 and и=8, the table's bank order, first to last column, is 0, 1, 2, 3, 4, 5, 6, 7. But for K=2, the order becomes 2, 3, 4, 5, 6, 7, 0, 1.

FIG. 5 illustrates the table stored in ROM 14 for a rotation of unabbreviated abridged shunted interleaves where Q=и and both are a number having an odd factor larger than one and thus, any number not power of two. The table of FIG. 5 differs from that of FIG. 4 in that there are no unused table positions in the L loops since Q=и. All positions or locations of the table are letters representing address values of [B,A] ordered in loops each of Q and thus, и positions. Since Q is not a power of two and thus, is not a factor of $2^A$, there is a remainder loop where 0<R<Q. The offset, S, and any adjustment to A and Γ are determined as previously described. As in the case of the abbreviated shunted interleaves where Q<и, shunt S is selected as previously described and provides an offset to the beginning locations F and F of successive interleaves so that the entire rotation of the interleaves addresses all of banks 20 equally for и·$2^A$ rows of the rotation, each row being addressed once for the rotation which then also becomes the case for the $2^{\Gamma+B+A}$ rows of the $2^\Gamma$ entire rotations of all memory.

FIG. 4 illustrates positive S=R. FIG. 5 illustrates both positive S=R and negative S=-Q+R because FIG. 5 also illustrates Q=И where S=R and S=-Q+R produce the same interleave as illustrated by interleave pattern 1 where column S is both column R and column -Q+R or -И+R because of wraparound modulo И. For any interleave of shunted interleaves where Q is not a power of two, S preferably equals either positive R (so that a first position F is in the column immediately following the column of the prior Y) or negative -Q+R (so that F is in the column Q-1 before the column of the prior Y). Thus, S may be either positive or negative, depending on whichever provides an S value prime to И and only if both are prime, then depending on whichever provides the most efficient ordered bank usage (sufficient G value) using each bank preferably no more often than once each Q usages. Preferably, any adjusting of Q is only between different odd values or less preferred even values having an odd factor larger than one, thus causing the interleaves to have remainder loops, R>0 as shown in both FIGS. 4 and 5.

In operation, fields A and B of physical address 11 (FIG. 4 or 5) are provided to the bank select apparatus 14 to provide bank selects to banks 20 (FIG. 2). Fields Γ and A of physical address are decoded to provide row selects within banks 20, and field Λ of physical address 11 is decoded to provide cell selects within banks 20. Together, the bank select, row select and cell select access a selected row of a selected bank to partially access the row and to access the selected data cell Ъ for copying to cache 18 (FIG. 3). Processor 16 provides a line select to cache 18 for placement of the cell Ъ in a selected cache line Ŧ. The data are thus in cache and available for execution of instructions by processor 16. The partially accessed row within the selected bank remains partially accessed so that the same or another data cell in the partially accessed row can be more quickly accessed than if not having remained partially accessed. The row remains partially accessed until any other data cell in a different row of the bank is accessed, whereupon the prior partially accessed row is deactivated and the newly accessed row becomes the one partially accessed.

As previously described, according to the present invention Q is odd or even having an odd factor greater than one, and $3 \leq Q \leq$ И. The interleaves are overlapping in that each of the banks is one of the Q banks for Q of the И interleaves; that is, the bank is the first of the Q banks for one of the Q interleaves, the second of the Q banks for another of the Q interleaves, and so on through the last of the Q banks of yet another of the Q interleaves. Additionally and in the same bank order, the first Q-1 banks of each of the И interleave is the last Q-1 banks of another interleave, the first Q-2 banks of each interleave is the last Q-2 banks of another interleave, and so on until the first bank of an interleave pattern is the last bank of yet another interleave pattern. This is the case for any valid shunt, ±1 or ±prime to И. Therefore, with wraparound, each interleave pattern has at least one bank in common with the Q-1 interleave patterns before it and with the Q-1 interleave patterns after it where some furtherest before may be the same interleave patterns as the same number furtherest after because 2(Q-1) may be more than И-1.

Upon processor 16 issuing an address 11 to address apparatus 10, the Λ field is decoded within a selected bank to generate a $2^\Lambda$-bit cell select and the Γ+A concatenated fields are decoded within the selected bank to generate a $2^a$-bit row select. The B+A concatenated fields address one of $2^A$ representations at a Ŧ, F, X, Y or Z position of one of И interleaves to select the correlated И-bit bank select where the A bits address the $2^A$ and the B bits address the И with the И allowed values of [B], 0, 1, ..., И-1. Thus, the bank select, row select and cell select together access an addressed cell in an addressed row in an addressed bank and, if the bank is coupled to cache 18 and is of the type that addresses and accesses one of the cells of an thereby also addressed row for a cache line, the addressed row preferably therefore becomes partially accessed for quicker additional accesses of its cells if not already.

Consider a memory having И=4 banks 0, 1, 2, 3 each containing $2^A$=16 addressable rows 0 ... 15 for a rotation of И=4 shunted interleaves 0 ... 3 so that B=ceiling($\log_2$(И))=2 and A=$\log_2$(16)=4 for a ROM 14 being addressed by B+A=6 bits as И·$2^A$=64 different addresses or address values. Consider the interleaves to be abbreviated interleaves where Q=3 so that for each of its И=4 interleaves, ROM 14 of FIG. 4 will contain L=floor($2^A$/Q)=5 full loops each of Q=3 of the interleave's $2^A$=16 contained representations each of one of the И·$2^A$=64 addresses to address ROM 14 and contain a remainder loop containing R=mod($2^A$,Q)=1 representation of the interleave's $2^A$=16$^{th}$ row address which is also either the 16$^{th}$, 32$^{nd}$, 48$^{th}$, or 64$^{th}$ row address of ROM 14 depending on the interleave being either the 1$^{st}$, 2$^{nd}$, 3$^{rd}$ or 4$^{th}$ of the И=4 interleaves. Consider also that each interleave is offset from its prior interleave by R=S=+1. If the first interleave pattern (interleave 0) commences at the first bank (0), the first interleave will select bank selects for the first 3 of banks 0-3 for the first 16 of ROM 14's 64 row addresses such that bank 0 will be selected for row select 0, followed by bank 1 for row select 1 and bank 2 for row select 2, followed by the second loop L addressing bank 0 for row select 3, bank 1 for row select 4, and bank 2 for row select 5, continuing to the sixth or remainder loop of the first interleave selecting bank 0 for row 15 to end the first interleave. Then beginning with the second interleave (interleave 1) offset from the first by +1 for continuing with the second 16 of ROM 14's 64 row addresses, the first loop L selecting bank 1 for row select 0, bank 2 for row select 1, bank 3 for row select 2, the second loop L selecting bank 1 for row select 3, etc, finishing this interleave with remainder loop selecting bank 1 for row 15. Then beginning the third interleave selecting bank 2 for row 0 and so on ending with bank 2 for row 15. Followed by beginning with the fourth interleave (interleave 3) offset from the third by +1 for continuing with the fourth and last 16 of ROM 14's 64 row addresses, the first loop L selecting bank 3 for row select 0, bank 0 for row select 1, bank 1 for row select 2, the second loop L selecting bank 3 for row select 3, and so on to end this loop, to begin and end each of third through fifth loops L, and finally the last of the 64 addresses of ROM 14 selecting bank 3 for row select 15 to begin and end the remainder loop of this the fourth and last interleave of the 4 interleaves. Thus, the exemplary interleaves provide bank selects for the И=4 banks in different sets of Q=3 banks, thus overlapping the banks being selected by successive interleaves and thereby, addressing each bank $2^A$=16 times for its $2^A$=16 row selects of one rotation of the interleaves.

Where the addressing is of successive rows, the bank selects are of successive ones of Q banks but where of successive cells, each $2^\Lambda$ successive cells are of a single one of the Q banks. More particularly, field Λ of address 11 advances through the field's $2^\Lambda$ cell addresses before advancing the value of the A field to select a next row and bank address as described above.

It will be appreciated that the tables in ROM 14 (FIGS. 4 and 5) representing the interleaves each have two principal portions: 1) the loops L and R containing the representations of the $2^A$ row addresses of each bank, and 2) the bank selects of the и banks. It will also be appreciated that the two portions of each interleave are identical for all interleaves, except the loops are shifted (with wraparound as previously noted) differently for each interleave so that a different bank select is at the beginning F of each interleave and therefore, also at reach respective same bank as to banks' first to last order from beginning to ending of each interleave. Thus, and as explained in my aforementioned application, ROM 14 may store a single table representing only one of the interleaves, such as the first interleave, with the shunt biasing the table to shift the bank selects relative to the loops of row address representations to derive the other interleaves. Alternatively, and as explained in my aforementioned application, the interleaves may be configured in an adder tree, or a combination of such a tree and ROM.

Efficiency for distributing data of powers of two strides among banks is one of four important qualities for judging different interleaves for interleaving partially accessed rows for accessing cache lines, namely distribution, order, adequacy and impediment ratio. The first three qualities are subjective and easily examined, whereas the impediment ratio of an interleave is an objective measure given by $Q^2/\text{и}^2$, where Q is the number of bank accessed during each of successive simple rotations of bank usage of the interleave scheme and и is the total number of memory banks accessed during all successive rotations. The impediment ratio is a measure of the odds that two relatively long data streams accessed via cache are alternately accessing the same bank. It is desirable that the impediment ratio be as small as practical less than one (its maximum possible value) and preferably significantly less than one, although not having Q be so small so as to degrade adequacy for having multiple data streams accessing in the same one of и interleaves at the same time.

Most interleave techniques distribute all data evenly among all of a memory's banks but may not do so finely so that each и successively interleaved addresses of the data are distributed among all и banks. Where Q=H, such as the classic, Ranade and Rau's pseudo random and prime degree interleaves, the best possible distribution is achieved. But for interleaving partially accessed rows for accessing cache lines, the important data are of large powers of two strides, and these are distributed very poorly by the classic interleave and only slightly better by Rau's pseudo random; they are, however, distributed very well by Ranade and Rau's prime degree interleaves. Distribution by a shunted interleave of the present invention does poorly where Q is a power of two, less poorly where Q is an even number having an odd factor, and well if Q is an odd number. Some interleave patterns, such as described by Lunteren in U.S. Pat. No. 6,381,668, employ plural interleave patterns, the rotation of which are selected by an address field, X, separated from the address field(s) selecting the banks by some number of bits N, N≧0. However, each additional N bit degrades the fineness of the interleave pattern such that $2^N-1/2^N$ of same positions of each 1/и of same sized blocks from $2^X$ rows to $2^{X+N}$ rows are in same banks. Additionally, bank usage within each given interleave pattern of $2^{X+N}$ rows becomes more disparate with more N bits, using some banks N+1 more times as other banks.

The second quality, order, of an interleave pattern is good if the interleave holds to a constant overall relative order for distributing adjacently addressed data among banks. Rau's pseudo random interleave does not have a good rating for order; the classic, Ranade, Rau's prime degree and the shunted interleave of the present invention have good ratings for order. Good order is important for having large amounts of data of different data streams flow entirely unimpeded, without having to alternately access cache lines from different rows of the same bank.

The third quality, adequacy, of an interleave pattern is best if Q=и for allowing up to Q different data streams to be accessing nearby data or data interleaved among the same Q banks. A shunted interleave of the present invention can have Q<и which is preferred for having a low impediment ratio even while reducing adequacy and distribution to still be within tolerable levels.

A shunted interleave according to the present invention may be odd or even, abridged or unabridged, and abbreviated or unabbreviated. Most preferred are odd abbreviated unabridged interleaves, second most are odd abbreviated abridged (even or odd) interleaves, and third most are odd unabbreviated (abridged odd) interleaves. Where Q is even, other than power of two, the effectiveness for interleaving rows is nearly as good as if Q is equal to its largest odd factor. Of all shunted interleaves, only odd interleaves are preferred for Q being prime to powers of two strides. Unabridged interleaves are preferred for allowing full use of the range of addressing of physical address 11 and potentially allowing a reduction in the A field to reduce the size of ROM 14. Abridged interleaves do not allow the A field, and therefore ROM, to be reduced because they disallow use of physical addresses where for the B field, $\text{и}≦[B]≦2^B-1$ (if A were reduced, then the void physical address spaces would be within at least largest page, an unmanageable condition for the operating system); the operating system not mapping pages to use any such physical addresses. Perhaps most importantly, abbreviated interleaves are preferred for having smaller impediment ratios.

One feature of the interleave pattern of the present invention is that the single remainder row of the pattern assures that the Q banks are accessed nearly equally during execution of each interleave pattern. More particularly, during execution of any one interleave pattern to successively access rows, R of the Q banks are each accessed L+1 times and each of the remaining Q-R banks is accessed one less time or L times. Moreover, the shunt causes execution of a complete rotation of all и interleave patterns to access each of the и banks $2^A$ times and may cause no bank to be used more often than once each Q bank usages (thus alleviating the R banks of each interleave pattern from being used any more often than the Q-R). While placement of the remainder row is preferably at the end of each interleave pattern 0, 1, ..., и-1, it would be possible to place the remainder row elsewhere in each interleave pattern, but doing so would risk creating a lack of opportunity for shunt occurring with each update of B field to cause separation between accesses to a same bank during execution of successive interleave patterns, particularly where the remainder row contains a single representation (e.g., R=1).

The present invention thus provides apparatus and process for shunted interleave access of interleaved memories having partially accessed data cells containing cache lines. By finely interleaving data amounts partially accessed per bank for all sizes of blocks up to largest pages for mapping virtual addressing, the shunted interleave patterns provide improved odds of quicker access to memory than prior classic and Rau's pseudo random interleaves and provide a more fine and even distribution of access for data of most interest (data of power of two strides as naturally has same positions in different blocks of data of sizes from single rows to largest pages for mapping virtual addresses) over all of the banks of a memory. The shunted interleave patterns also allow practical designs for addressing apparatuses to translate fewer address bits for accessing large bit-addressed physical memories, thus providing a significant improvement over the Ranade and Rau prime degree interleaves.

Although the present invention has been described with reference to preferred embodiments, workers skilled in the art will recognize that changes may be made in form and detail without departing from the spirit and scope of the invention.

The invention claimed is:

1. Apparatus for addressing a memory of a computer system, the memory containing $n$ individually and successively addressable memory banks where $n$ is an integer, each memory bank having a plurality of individually addressable rows, each row containing a plurality of individually and successively addressable data cells for storing data arranged such that upon addressing and accessing a data cell in a row of a memory bank, all of the other data cells of the row containing the addressed data cell are partially accessed, and all the data cells of the row are available for a quicker next access than for an access to a data cell in any other of the bank's rows not already accessed or partially accessed, the apparatus comprising:
   a bank select device for choosing bank selects for addressing the memory banks in an offset interleaved pattern, the bank select device comprising
   a plurality of addressable locations, and
   a plurality of storage locations, each storage location being correlated to a respective one or more of the plurality of addressable locations and each addressable location being correlated to one of the plurality of storage locations, each storage location storing a respective bank select for addressing a respective one of the memory banks, there being as many storage locations as memory banks and at least as many addressable rows in all of the memory banks as there are addressable locations,
   the addressable locations and storage locations being grouped into a plurality of $n$ interleave patterns such that, for each interleave pattern, there are Q storage locations and there are $2^A$ addressable locations arranged in L sequential loops each containing Q sequentially addressable locations and one remainder loop containing R sequentially addressable locations, where $L \cdot Q + R = 2^A$, $0 < R < Q$, $n \geq Q \geq 3$ and Q has at least one odd factor greater than 1, and where A, L, Q and R are integers,
   a shunt having a value S defining an offset as a difference in bank selects for successive interleave patterns so that each interleave pattern of the plurality of interleave patterns commences with a different bank select and a complete rotation of all of the $n$ interleave patterns addresses each of the $n$ memory banks an equal number of times,
   the bank select device being responsive to an input address to an addressable location to choose the bank select from the correlated storage location such that successive input addresses addressing successive addressable locations during execution of an interleave pattern choose successive bank selects, the plurality of interleave patterns being organized so that bank selects are chosen to address a different set of Q successive memory banks as offset by S for successive ones of the plurality of interleave patterns; and
   address apparatus responsive to memory addresses to address memory banks using the banks selects chosen by the bank select device.

2. The apparatus of claim 1, wherein the shunt, S, is selected from the group consisting of $mod(2^A, Q)$ and $-Q + mod(2^A, Q)$ where |S| and $n$ share no factor other than 1.

3. The apparatus of claim 2, where A, Q, $n$ and S have values such that a gain value is at least as large as a stride between same respective row addresses of successive largest pages so that blocks having a range of sizes between and including that of the largest page and a single row have their first banks spread evenly among different ones of all $n$ banks.

4. The apparatus of claim 3 wherein the gain value is at least as large as a largest page for virtual mapping of the memory.

5. The apparatus of claim 2, wherein the memory banks addressed by execution of an interleave pattern are accessed such that no addressed bank is accessed more than once more than any other addressed bank during execution of the interleave pattern.

6. The apparatus of claim 2, where A, Q, $n$ and S have values such that a gain value is at least as large as a largest page for virtual mapping of the memory.

7. The apparatus of claim 2, wherein each interleave pattern is offset from each other of the interleave patterns such that a first location of a first loop of an interleave pattern is correlated to a bank select either immediately after the bank select correlated with a last location of a remainder loop of a next prior interleave pattern or Q−1 before the bank select correlated with the last location of the remainder loop of the next prior interleave pattern.

8. The apparatus of claim 2, wherein each data cell contains a plurality of data elements, the apparatus further comprising
   a cache coupled to the memory for individually storing data elements from each of a plurality of respective data cells as respective cache lines and for transferring cache lines to respective memory banks for storage as data in respective cells in respective rows, and
   a processor coupled to the cache to execute instructions on data received from data elements in individually addressable cache lines of data and to send results of executed instructions as data elements to the cache for storage as data elements in cache lines to alter the respective cache lines.

9. The apparatus of claim 1, where A, Q, $n$ and S have values such that a gain value is at least as large as a largest page for virtual mapping of the memory.

10. The apparatus of claim 1, wherein each interleave pattern is offset from each other of the interleave patterns such that a first location of a first loop of an interleave pattern is correlated to a bank select either immediately after the bank select correlated with a last location of a remainder loop of a next prior interleave pattern or Q−1 before the bank select correlated with the last location of the remainder loop of the next prior interleave pattern.

11. The apparatus of claim 1, wherein each data cell contains a plurality of data elements, the apparatus further comprising
   a cache coupled to the memory for individually storing data elements from each of a plurality of respective data cells as respective cache lines and for transferring cache lines to respective memory banks for storage as data in respective cells in respective rows, and
   a processor coupled to the cache to execute instructions on data received from data elements in individually addressable cache lines of data and to send results of executed instructions as data elements to the cache for storage as data elements in cache lines to alter the respective cache lines.

12. The apparatus of claim 1, wherein the memory banks addressed by execution of an interleave pattern are accessed such that no addressed bank is accessed more than once more than any other addressed bank during execution of the interleave pattern.

13. The apparatus of claim 1, wherein the execution of a full rotation of interleave patterns by the bank select device addresses all of the memory banks an equal number of times.

14. A computer process for selectively addressing a memory containing и memory banks each having a plurality of individually addressable rows, each row having a plurality of individually and successively addressable data cells arranged such that upon addressing and accessing a data cell in a row, all of the other data cells of the row containing the addressed data cell are partially accessed, and all data cells of the row are available for quicker additional access than for an access to a data cell in any other row of the bank not already accessed or partially accessed, the process comprising steps of:
  defining at least и interleave patterns each having at least $2^A$ addressable locations and at least и storage locations of a bank select device, there being at least as many addressable rows in all of the memory banks as the bank select device has addressable locations, each interleave pattern having at least Q storage locations and at least $2^A$ addressable locations, the addressable locations being arranged in L sequential loops of Q sequentially addressable locations and one remainder loop containing R sequentially addressable locations, where $L \cdot Q + R = 2^A$, $и \geq Q \geq 3$, $0 < R < Q$, and и, Q, L, R and A are integers and Q has at least one odd factor greater than 1,
  interleaving successively addressable rows in different memory banks,
  storing a different bank select in each of the и storage locations,
  the step of defining the interleave patterns comprising, for each pattern, steps of
    correlating each of the sequentially addressable locations in each of the L sequential loops to a respective one of the Q storage locations and each of the sequentially addressable locations in the remainder loop to a respective one of R of the Q storage locations, and
    applying a shunt having a value, S, to offset successive interleave patterns so that each interleave pattern commences with a different bank select, the plurality of interleave patterns being organized so that execution of a complete rotation of the plurality of interleave patterns addresses all of the plurality of memory banks an equal number of times,
  the plurality of interleave patterns being organized so that execution of a complete rotation of the plurality of interleave patterns addresses all of the plurality of memory banks an equal number of times,
  executing interleave patterns in response to an input address to choose an addressable location and thereby choose the bank select from the storage location correlated to the chosen addressable location such that successive input addresses during execution of an interleave pattern choose respective successive bank selects; and
  addressing the memory banks with the chosen bank selects to partially access all data cells of a row of data cells within the addressed memory bank.

15. The computer process of claim 14, wherein the shunt value is determined by steps of:
  a) defining S as $0 < S < и$ and one or more solutions of relationships selected from group of relationships consisting of
    i) $S = \mod(2^A, Q)$ if $2^A$ modulo Q is +1 or a positive prime to и and
    ii) $S = -Q + \mod(2^A, Q)$ if $-Q + (2^A \mod Q)$ is $-1$ or a negative prime to и,
  where a minimum period of bank usage by successive row addresses is Q,
  b) determining a gain value, G, as a function of A, Q, и, R and S and a minimum bank usage of Q where the gain value is at least as large as a stride between same respective row addresses of successive largest pages and is a measure of how large the largest page may be as containing a range of blocks of sizes between and including that of the largest page and a single row so that all blocks of all the range sizes in memory have their first banks spread evenly among different ones of all и banks, and
  c) selecting S as the solution of i) or ii) that results in G being at least as great as a largest page size.

16. The computer process of claim 15, further comprising steps of:
  d) establishing initial values for Q and и for a desired impediment ratio and adequacy,
  e) establishing an initial value of A so either $2^A$ is the number of rows of a largest page for mapping virtual addresses or $L > 0$, whichever establishes the largest value for A,
  f) selecting a value for S from step (a) which is nearest to zero, and
  g) while maintaining a minimum period of bank usage of Q for successive row addresses, either
    i) iteratively repeating steps b) through f) for increasing values of A until the value of G indicates a largest stride not less than largest page, or
    ii) iteratively repeating steps b) through f) for decreasing values of A until just before either the value of G first indicates a largest stride less than largest page or $L = 0$, whichever establishes the largest value for A, but not smaller than the initial value of A if $и < 2^B$.

17. The computer process of claim 15, further including a step of:
  adjusting values of one or more of A, Q, и, a minimum period of bank usage, largest page size and the gain value, G, to find S and a collectively optimum value for each of A, Q, и, a minimum period of bank usage, largest page size, G and S.

18. The computer process of claim 14, wherein the memory includes a cache, each memory bank being addressable to transfer a plurality of data elements from respective ones of the plurality data cells in a plurality of rows of data of respective memory banks as respective cache lines to the cache and to transfer cache lines from the cache to respective ones of the memory banks for storage in respective data cells in respective rows of data, wherein the step of addressing the memory banks further comprising:
  successively accessing addressed data cells so data as cache lines may be exchanged between the respective data cells and the cache,
the process further comprising:
  partially accessing at least the row of data containing the addressed data cell for quicker additional access to any of the row's data cells than for an access to data cells in other rows not currently partially accessed of the memory bank.

19. The computer process of claim 14, wherein each memory bank contains $2^я$ addressable rows and $2^{я+я}$ addressable cells and a processor supplies data addresses representative of row and cell locations in all of the plurality of memory banks, each data address having at least a Γ-bit field, a B-bit field, an A-bit field, and a Λ-bit field where Γ, B, A, and Λ are integers and B=ceiling(log$_2$и), the process further comprising steps of concatenating the B-bit and A-bit fields of a data address, addressing an addressable location in the bank select device with the concatenated B-bit and A-bit fields to choose a correlated bank select, concatenating the Γ-bit, A-bit and Λ-bit fields of the data address, addressing and accessing data of a cell identified by the Γ+A+Λ bits of a memory bank identified by the chosen bank select while addressing and partially accessing data of all the cells of the cell's row identified by the Γ+A bits.

20. The computer process of claims 14, wherein programs to access memory data which are processed together for accessing same respective portions of two or more blocks of memory data of same or different size are less likely to access the portions from the same memory bank and therefore more likely to access data of cells for cache lines more quickly as already partially accessed.

* * * * *